(12) United States Patent
Jacobson et al.

(10) Patent No.: US 10,447,492 B1
(45) Date of Patent: Oct. 15, 2019

(54) RESIDENTIAL MANAGEMENT SYSTEM FOR USE WITH A PLURALITY OF HOME AUTOMATION SYSTEMS

(71) Applicant: Savant Systems, LLC, Hyannis, MA (US)

(72) Inventors: Arthur A. Jacobson, Centerville, MA (US); Michael C. Silva, East Sandwich, MA (US); David W. Tatzel, West Yarmouth, MA (US); Nathan A. Trapp, Sandwich, MA (US)

(73) Assignee: Savant Systems, LLC, Hyannis, MA (US)

( * ) Notice: Subject to any disclaimer, the term of this patent is extended or adjusted under 35 U.S.C. 154(b) by 252 days.

(21) Appl. No.: 14/339,864

(22) Filed: Jul. 24, 2014

(51) Int. Cl.
*H04L 12/28* (2006.01)
*G06F 3/0484* (2013.01)
*G05B 15/02* (2006.01)

(52) U.S. Cl.
CPC .......... *H04L 12/2823* (2013.01); *G05B 15/02* (2013.01); *G06F 3/0484* (2013.01)

(58) Field of Classification Search
CPC .... H04L 12/2823; G06B 15/02; G06F 3/0484
USPC .......................... 709/217, 219, 220, 223, 224
See application file for complete search history.

(56) References Cited

U.S. PATENT DOCUMENTS

| 6,891,838 | B1 | 5/2005 | Petite et al. |
| 2007/0142022 | A1 | 6/2007 | Madonna et al. |
| 2007/0143801 | A1 | 6/2007 | Madonna et al. |
| 2010/0023865 | A1* | 1/2010 | Fulker .................. G06F 3/04817 715/734 |
| 2011/0251807 | A1* | 10/2011 | Rada ........................ G01D 4/00 702/61 |
| 2012/0096120 | A1 | 4/2012 | Couillabin et al. |
| 2012/0109384 | A1* | 5/2012 | Stepanian ............... G06F 21/10 700/275 |
| 2014/0005851 | A1* | 1/2014 | Frei ..................... H04L 29/1249 700/295 |
| 2014/0098247 | A1* | 4/2014 | Rao ......................... H04W 4/20 348/207.1 |
| 2014/0156028 | A1 | 6/2014 | Subramaniam et al. |

(Continued)

FOREIGN PATENT DOCUMENTS

WO    WO 2012060679 A1 *  5/2012  ............. G08B 25/08

*Primary Examiner* — Chirag R Patel
*Assistant Examiner* — Marshall M McLeod
(74) *Attorney, Agent, or Firm* — Cesari and McKenna, LLP; James A. Blanchette (57) ABSTRACT

In one embodiment, a technique is provided managing a plurality of home automation systems in different residential structures. The plurality of home automation systems are bound to a cloud-based residential management system (RMS). The RMS periodically receives status and diagnostics information from home automation systems, and displays, on a web-enabled device, a plurality of RMS user interface (UI) screens. The RMS UI screens provide an all systems view which lists each the plurality of home automation systems, a system details view which shows a summary of status information for a selected one of the plurality of home automation systems, and an equipment level view which shows status information for individual devices of the selected home automation system. At least some of the individual devices are non-network available devices that lack a direct connection to an Internet Protocol (IP)-based network.

14 Claims, 12 Drawing Sheets

(56) References Cited

U.S. PATENT DOCUMENTS

2014/0266717 A1* 9/2014 Warren ................. G06Q 10/20
340/540
2015/0081568 A1* 3/2015 Land, III ............... G06Q 30/00
705/304

* cited by examiner

Send a New Invite ⊗

Recipients First Name

Recipients Last Name

Recipients Email Address

☐ Administrator?
Enables a user to manage other users,
e.g. invite, delete, move, edit users etc.

Hi </> FirstName </>

I'm inviting you to join me in using my new Savant Smart Home System. Lorem ipsum dodar sit starter message user or modify and customize.

Cancel          Send Invite

---

550

Resend Invite ⊗

Rob

Smith rob.smith@harvard.edu

☐ Make User on Administrator
Enables a user to manage other users,
e.g. invite, delete, move, edit users etc.

Hi Ron,

Please respond to this invitation so that you can access our smart home system when you go on break from school. Your mother is getting anxious that you won't be able to experience our newest geewhiz toy!

Cancel          Send Invite

*FIG. 5C*

Non-Network Available Devices 600

IR — Blu-Ray Player (650)
- connected: Yes
- controller name: SSP
- controller port name: IR (Serial PWM)
- bytes sent: 23071
- messages sent: 78
- last message sent: <09 F9 11 02 9D 74 E3 5B D8 41 56 C5 63 56 88 C0>
- profile: A 2.1.0.2
- port number: 2

RS-232 — HVAC Controller (660)
- connected: No
- controller name: SSP
- controller port name: IR (Serial PWM)
- bytes sent: 23071
- messages sent: 78
- bytes received: 1202
- messages received: 18
- last message sent: <09 F9 11 02 9D 74 E3 5B D8 41 56 C5 63 56 88 C0>
- last message received: <31 41 5A>
- response timeouts: 2
- profile: A 2.1.0.2
- port number: 2

GPIO — Garage Door Opener (670)
- connected: Yes
- controller name: SSP
- controller port name: GPIO 1
- messages sent: 78
- messages received: 18
- last message sent: ON
- last message received: TURNED_ON
- response timeouts: 2
- profile: A 2.1.0.2
- port number: 2

| Fig. 6A | Fig. 6B | Fig. 6C |

RESIDENTIAL MANAGEMENT SYSTEM FOR USE WITH A PLURALITY OF HOME AUTOMATION SYSTEMS

BACKGROUND

Technical Field

The present disclosure relates generally to home automation systems and more specifically to the remote management of home automation systems disposed in residential structures.

Background Information

Home automation systems are becoming increasingly popular in both residential and commercial buildings. Such systems may be capable of controlling, switching data between, and otherwise interacting with a wide variety of devices, including audio/video devices (A/V) devices, heating ventilation and cooling (HVAC) devices, security devices, energy conservation devices, communications devices, telephony devices, and/or other types of devices. Often, home automation systems are installed by a dealer, who may specify devices of the system, install the devices, and configure the devices to interoperate with each other, and in response to input of an end user on one or more control devices. In addition to initial installation, a dealer may provide follow-on services, such as maintenance and update for installed systems. In order to most effectively provide such follow-on services, it is desirable to know the current condition of each home automation system serviced by the dealer. However, this can be a challenge with existing techniques.

While some home automation systems are capable of remote access and diagnostics, which may permit a dealer to ascertain the current condition of at least some aspects of the home automation system from a remote location (e.g., from the dealer's office), many existing remote access and diagnostics schemes suffer shortcomings. For example, some schemes require knowledge of an Internet Protocol (IP) address of a controller of the home automation system, which is then used to establish a connection to the system. Yet sometimes firewalls installed to protect devices from malicious traffic may block unsolicited in-bound traffic to specific IP addresses. Further, some internet service providers (ISPs) cycle through IP addresses, so that the addresses of installed systems are not static. These configurations may hinder a dealer's ability to remotely access installed systems in schemes where require communication to an IP address.

Further, while some home automation systems are capable of remote access and diagnostics, often the information available is limited. In some cases, the information only includes status of the controller of the home automation system, and does not reflect the current state of all subsystems and/or devices that may be controlled by the controller. In particular, information may not be available regarding subsystems and/or devices that are not directly connected to an IP-based LAN within the home, but that are controlled by the controller through other type of connections, including a variety of types of legacy connection schemes.

Further, in addition to permitting dealers to remotely access and diagnose home automation systems as part of follow-on services, end users may desire to allow certain others individuals (e.g., other types of service providers, relatives, friends, etc.) to remotely access their home automation systems. A user may desire to review who has access, and to change who has access, in a simple and intuitive manner. However, many existing schemes lack the ability to manage remote access permissions among selected individuals.

Accordingly, there is a need for improved techniques for the remote management and access to home automation systems disposed in residential structures.

SUMMARY

In one embodiment, a cloud-based residential management system (RMS) is provided for managing a plurality of home automation systems in different residential structures. Home automation systems in different residential structures are bound to the RMS, for example, by opening connections between host controllers of the home automation systems and servers of the cloud-based RMS. Status and diagnostics information for devices of the home automation system are periodically provided to the RMS. The devices may include network-available devices, that are capable of opening their own connections, as well as non-network available devices, for which status and diagnostics information is compiled by the host controllers and then provided to the RMS. RMS user interface screens may be generated from the status and diagnostic information and displayed to both dealers and end users.

For dealers, RMS UI screens, among a variety of other functionality, may provide an all systems view which lists each the home automation systems bound to the RMS for which the dealer has authorization to access, a system details view which shows a summary of status and diagnostics information for a selected one of the home automation systems, and an equipment level view which shows status and diagnostics information for individual devices of the selected home automation system, where at least some of the individual devices are non-network available devices. The RMS UI screens may also provide the dealer with an invitation system, using which the dealer may see individuals (e.g., end users, employees of the dealer, etc.) that have been invited to access a given home automation system, modify such access, and invite additional individuals to have access to the home automation system.

For end users, RMS UI screens may provide an all systems view, system details view and equipment level views, similar to those provided to the dealer. However, rather than see all the home automation systems associated a dealer's install base, the systems may be limited to those associated with the end user. Further, if the end user has invite permissions, the end user may use the invitation system. Using the invitation system, the end user may allow service providers, relatives, friends, etc. to remotely access their home automation systems.

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings, of which.

DETAILED DESCRIPTION

An Example Home Automation System

Figure 1:
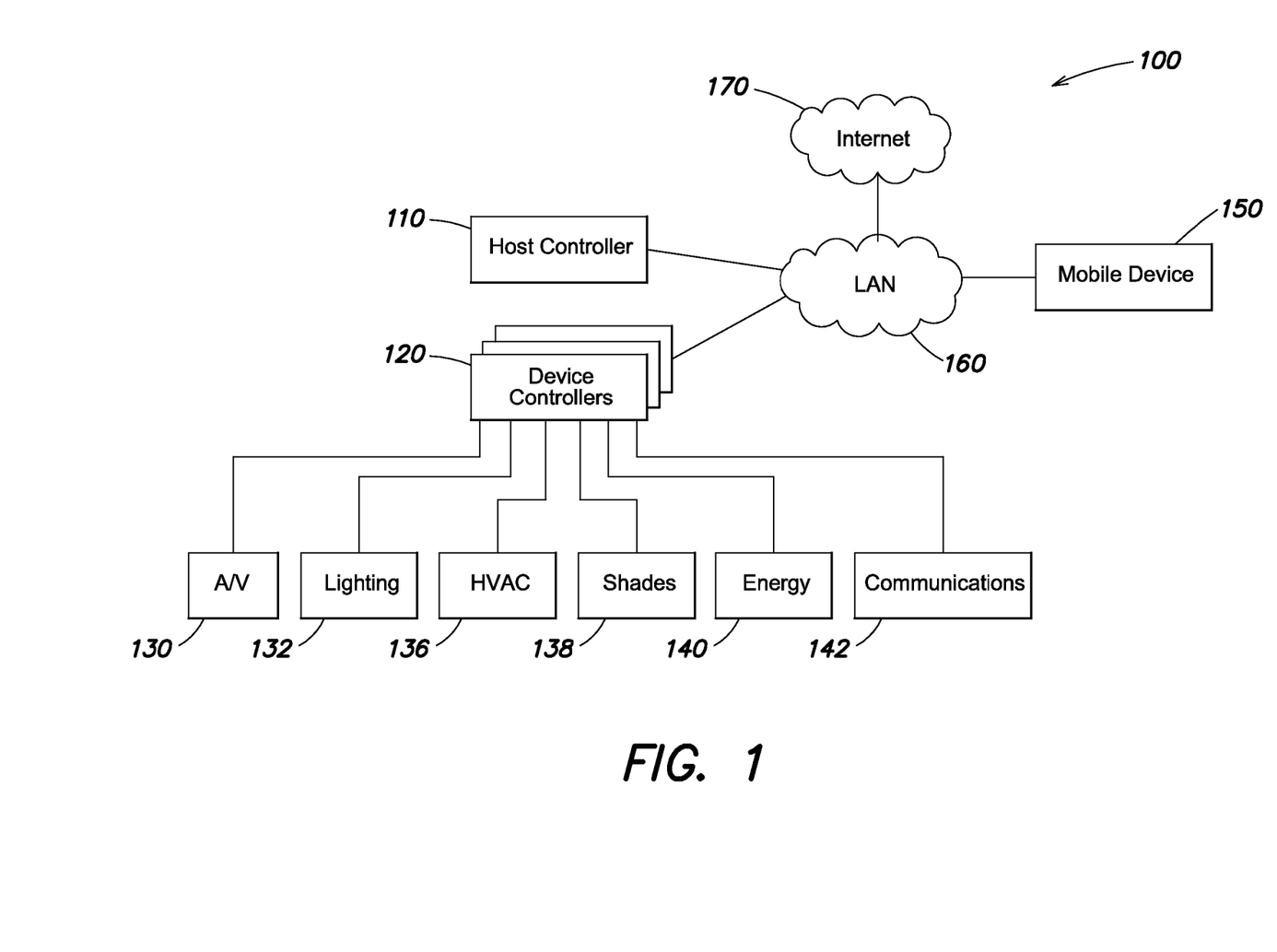
FIG. 1 is a block diagram of an example architecture of a home automation system operable to control devices about a residential structure.

FIG. 1 is a block diagram of an example architecture of a home automation system 100 operable to control devices about a residential structure. At the core of the system 100 is a host controller 110, one or more device controllers 120, and one or more mobile devices 150 in communication over a local area network (LAN) 160, for example, an Internet Protocol (IP)-based LAN. The LAN 160 may be coupled to the Internet 170. The host controller 110 controls and monitors operations of the device controllers 120, as well as provides user interface (UI) interpretation, system administration and monitoring, and/or other high-level control functions. The device controllers 120 operate to switch signals between, and provide low-level control to, a variety of interconnected devices and/or subsystems 130-142. The mobile devices 150 display UIs for interacting with the home automation system 100.

More specifically, the host controller 110 may maintain a state center that stores feedback describing the operation of controlled devices and subsystems 130-142, and may provide state to the mobile devices 150 that have registered to receive updates. The host controller 110 may also receive control commands from mobile devices 150 indicating user input received in UIs shown on the mobile devices. The host controller 110 interprets such commands and sends messages to the device controllers 120 to implement activities the user may desire to participate in.

The device controllers 120 may provide N×N switching, audio and video processing, device control, and other management functions to the various device and/or subsystems 130-142 that are present. Depending on the device and/or subsystem, the device controller 120 may communicate with them (e.g., provide device control) in various manners. In some cases, the device controllers 120 may utilize IP-based communication, for example, over the LAN 160 or point-to-point links (e.g., point-to-point Ethernet links). However, at least some of the device and/or subsystems 130-142 may not support IP-based communication. In such cases, the device controllers 110 may utilize other forms of communication, for example, RS-232, general-purpose input/output (GPIO), radio frequency (RF), infrared (IR), etc. As used herein, the term "non-network available device" refers to a device and/or subsystem of a home automation system that is not directly connected to an IP-based network, such as LAN 160. At least some of the devices and/or subsystems 130-142 may be considered non-network available devices. Furthermore, as used herein the term "network available device" refers to a device and/or subsystem of a home automation system that is directly connected to an IP-based network, such as LAN 160. At least some of the device and/or subsystems 130-142 may be considered network available devices.

The devices and/or subsystems 130-142 may include A/V devices 130, categorized into source devices that originate audio and/or video signals (such as cable boxes, digital video disc (DVD) players, media players, etc.), processing devices that manipulate audio and/or video signals (such as pre-amps, digital signal processors, amplifiers, etc.), and output devices that output audio and/or video signals (such as televisions, speakers, projectors, etc.). The devices and subsystems 130-142 may also include lighting devices 132, such as lighting controllers, keypads and/or lamp modules, and the like. In addition, heating ventilation and cooling (HVAC) devices 134 may be provided that include one or more thermostat processing units, thermostats, sensors, and the like. Security devices may also be coupled to the device controllers 120, including motion sensors, security cameras, home healthcare sensors, related controllers, etc. Further, shade control devices 138 may be provided that include motor operated window shades, motor operated window blinds, related controllers, etc. Energy conservation devices 140 may be provided that include one or more energy monitors, current transformers, voltage sensors and the like. Still further, a communications subsystem 142 may be present that provides telephony, intercom and other related functions, utilizing one or more private branch exchanges (PBXs), gateways, handsets, and other units.

Looking again to the mobile devices 150, it should be understood that they may take a variety of forms. As used herein, the term "mobile device" refers to a general purpose electronic device that executes a general-purpose operating system and is adapted to be transported on one's person. Devices such as tablet computers (e.g., the iPad® tablet running an iOS® mobile operating system) and smartphones (e.g., the iPhone® smartphone running an iOS® mobile operating system or an Android® smartphone running an Android® mobile operating system) are considered mobile devices. Desktop computers would generally not be considered mobile devices. The mobile devices 150 may execute a control application (app) to interact with the host controller 110, and thereby control the home automation system 100.

An Example Residential Management System

Figure 2:
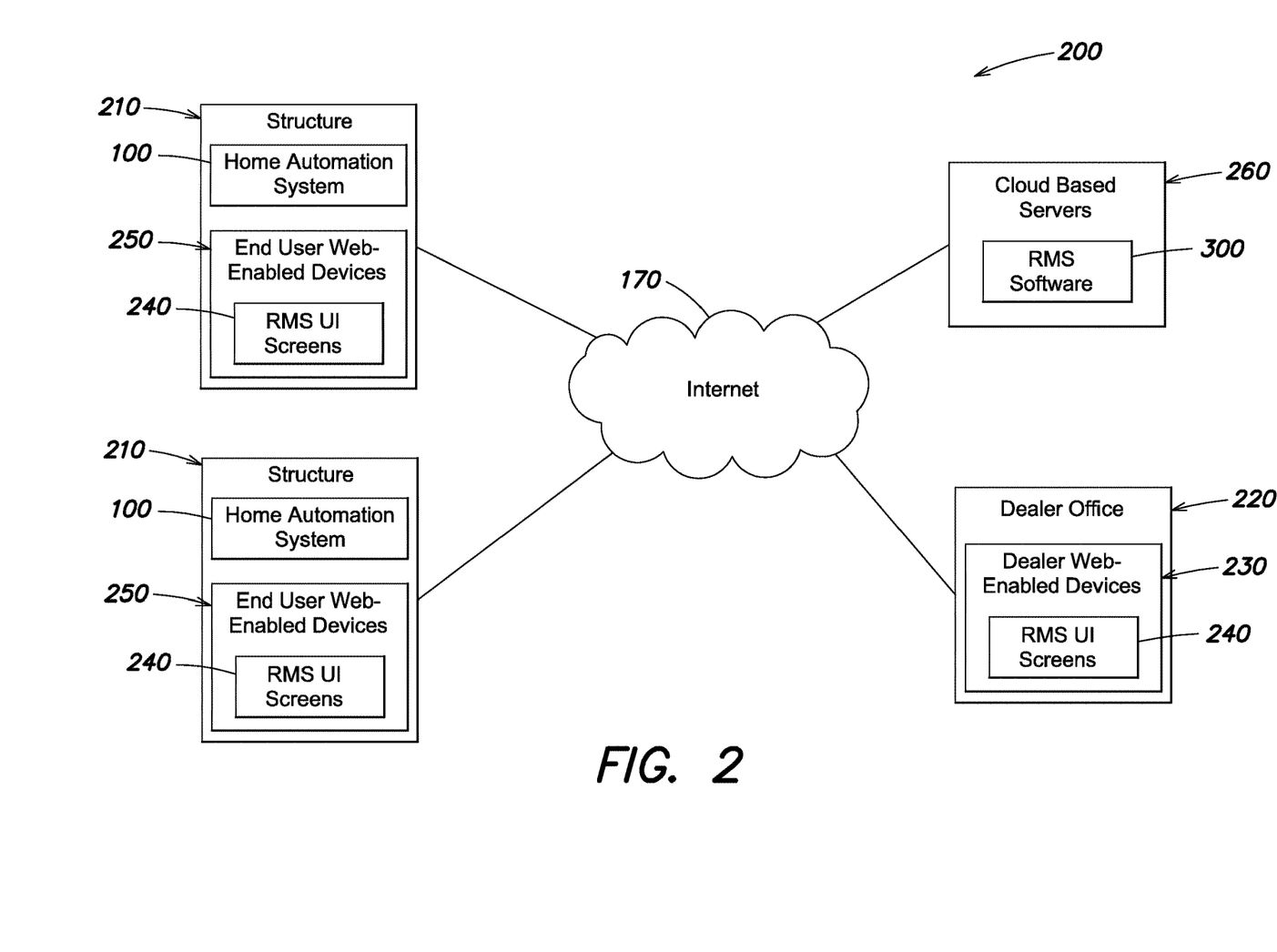
FIG. 2 is a block diagram of an example system configuration that enables remote management of a plurality of home automation systems in different residential structures.

A plurality of home automation systems 100 may be remotely managed using an example residential management system (RMS) 300. FIG. 2 is a block diagram of an example system configuration 200 that enables remote management of a plurality of home automation systems 100 in different residential structures 210. Each structure 210 may be associated with a different end user or set of end users (e.g., the resident(s) of the home). The home automation systems 100 may be installed by a dealer, who conducts business, at least primarily, from a dealer office 220 or other remote location. The dealer may utilize one or more web-enabled devices (i.e., computers, mobile devices, or other electronic devices capable of running a web browser) 230 to access RMS UI screens 240. While the dealer's web-enabled devices 230 are shown located at the dealer office 220, it should be understood that such device 230 need not be so located. For example, the dealer's web-enabled devices 230 may be mobile and change location frequently.

Further, end users of the home automation systems 100 may utilize their own web-enabled devices 250 to interact with the RMS UI screens 240. Similar to the dealer's web-enabled devices 230, while end user's web-enabled devices 250 are shown located in the structures 210, it should be understood that such devices 250 need not be so located.

Figure 3:
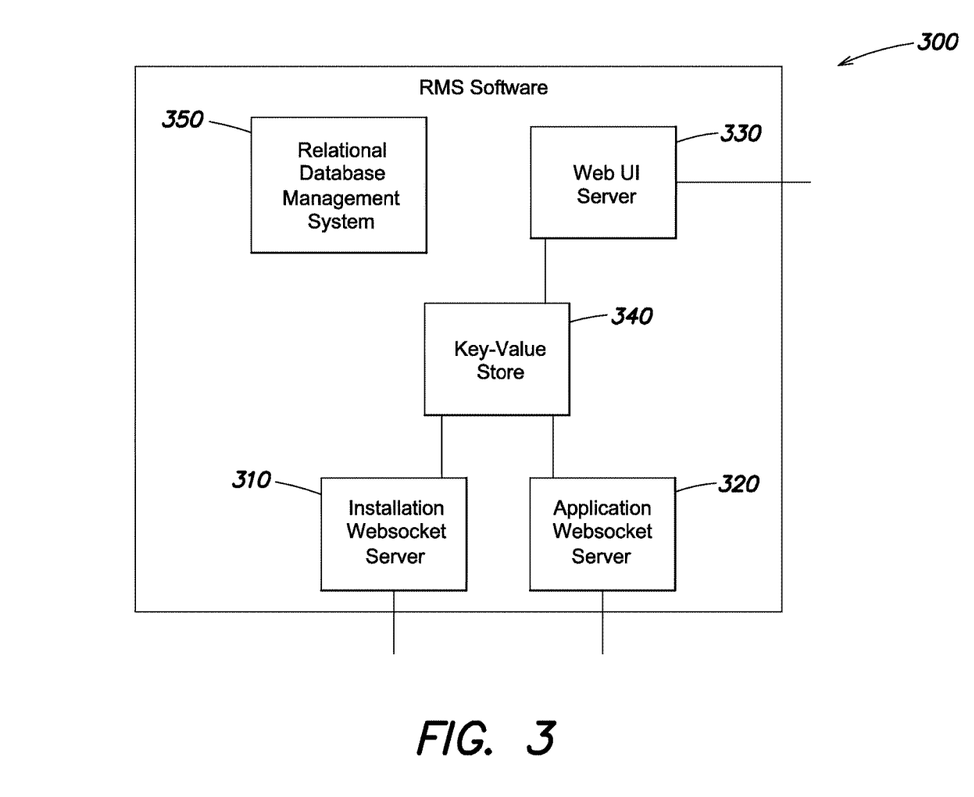
FIG. 3 is a block diagram of components of an example RMS.

The underlying RMS 300 may be executed on one or more cloud-based servers 260, which are accessible via the Internet 170 to home automation systems 100, the dealer's web-enabled devices 230, the end user's web-enabled devices 240, and potentially other devices. FIG. 3 is a block diagram of components of example RMS 300. The RMS 300 may include an installation websocket server 310 that is utilized by host controllers 110, and some device controllers 120 (e.g., lighting controllers). The installation websocket server 310 allows the host controllers 110, and some device controllers 120 to communicate directly with the RMS 300, and communicate with control apps executing on mobile devices 150 via pass through messages. The RMS 300 may also include an application websocket server that is used by control apps executing on mobile devices 150 to communicate directly with the RMS 300 and communicate with host controllers 110, and some device controllers 120, via pass through messages. A WebUI Server 330 may be provided to interface with dealer and end user web-enabled devices 230, 250 and provide RMS UI screens 240. The WebUI Server 330 may utilize HTTP(s) and certain JavaScript libraries for real-time web applications, such as the socket.io library. A key-value store 340, such as the Redis open source key-value store, may store session information and act as a communication interface between the WebUI server 330 and the installation websocket server 310 and application websocket server 320. Further, a relational database management system 350, for example a PostgreSQL relational database management system, may be employed to store persistent information concerning home automation systems 100, users, associations, and other information.

In operation, when a home automation system 100 is installed or, for example, reconfigured, the home automation system is bound to the RMS 300. Specifically, websocket connects may be opened between a host controller 110 and potentially certain device controllers 120 (e.g., lighting controllers) of the home automation system and the installation websocket server 310, and websocket connections may be opened between mobile devices 150 and the application websocket server 320. Identifying information for the home automation system (such as a unique identifier (UID) of the host and a configured alphanumeric name), and initial status and diagnostics information may be provided. The status and diagnostics information may include information for devices that have websocket connections to the RMS 300, as well as for non-network available devices, for which status and diagnostics information is compiled by a host controller 110 and then provided to the RMS 300. The websocket connection is maintained open, and may be used to provide updated status and diagnostics information to the RMS 300 over time.

Upon demand, a dealer may access RMS UI screens 240 on the dealer's web-enabled devices 230. The dealer may initially configure a dealer account with the RMS 300. Thereafter, the dealer may authenticate into such account. The RMS UI screens 240, among a variety of other functionality, may provide the dealer with an all systems view which lists each of the home automation systems 100 bound to the RMS for which the dealer has authorization to access, a system details view which shows a summary of status and diagnostics information for a selected one of the home automation systems, and an equipment level view which shows status and diagnostics information for individual devices of the selected home automation system, where at least some of the individual devices are non-network available devices. The RMS UI screens 240 may also provide the dealer with an invitation system, using which the dealer may see individuals (e.g., end users, employees of the dealer, etc.) that have been invited to access a given home automation system, modify such access, and invite additional individuals to have access to the home automation system.

Upon demand, an end user may also access RMS UI screens 240 on the end user's web-enabled devices 250. An end user account may be initially created by the dealer (e.g., via an invite) or as the result of an invite by an end user with invite permissions. Thereafter, the end user may authenticate into such account. The RMS UI screens 240, among a variety of other functionality, may provide the end user with an all systems view, systems details view and equipment level views, similar to those provided to the dealer. However, rather than see all the home automation systems associated with a dealer's install base, the systems may be limited to those associated with the end user (e.g., to which the end user has been invited to access). Further, if the end user has invite permissions, the end user may use the invitation system, such that they can see individuals who have access to a given home automation system, modify such access, and invite additional individuals to have access to the home automation system. Using the invitation system the end user may allow service providers, relatives, friends, etc. to remotely access their home automation systems.

Figure 4A:
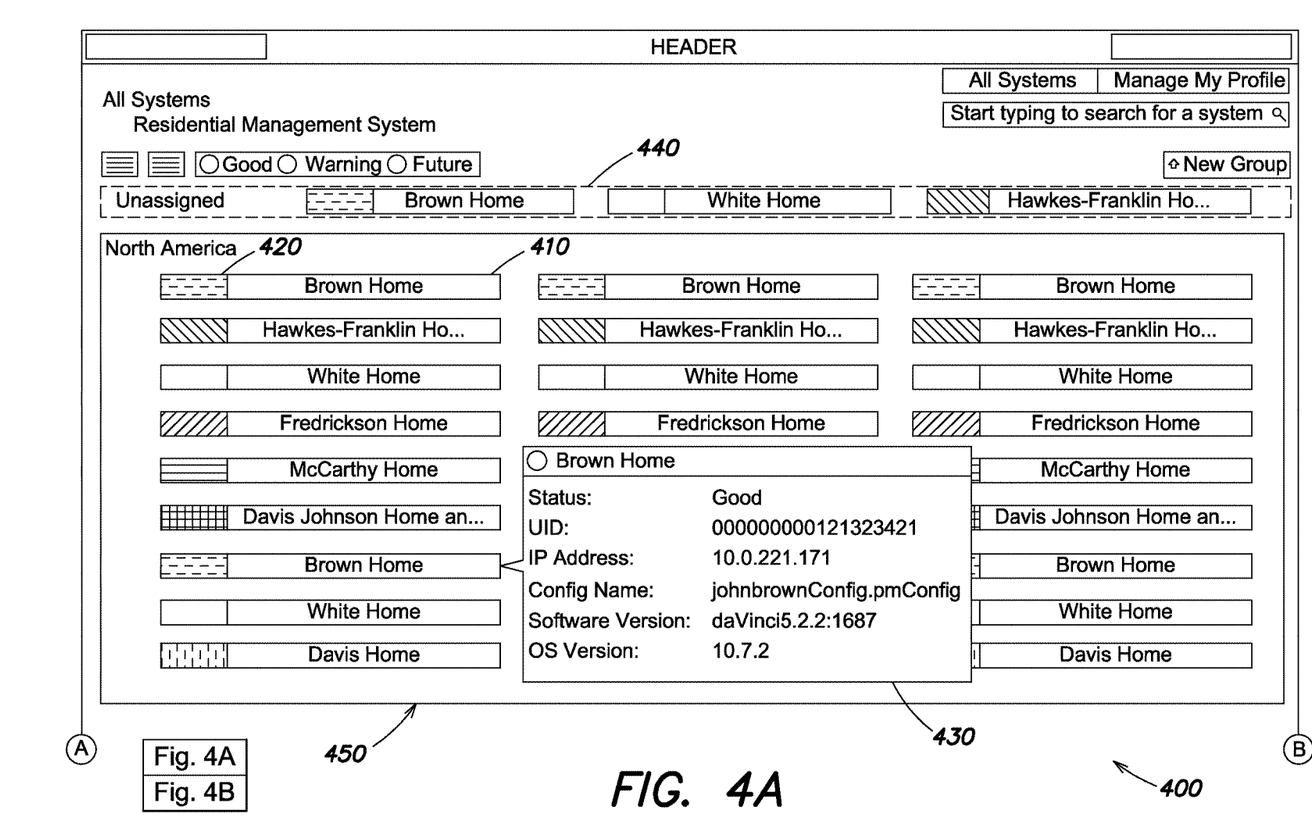
FIGS. 4A and 4B are an example RMS UI screen that provides an all systems view.
Figure 4B:
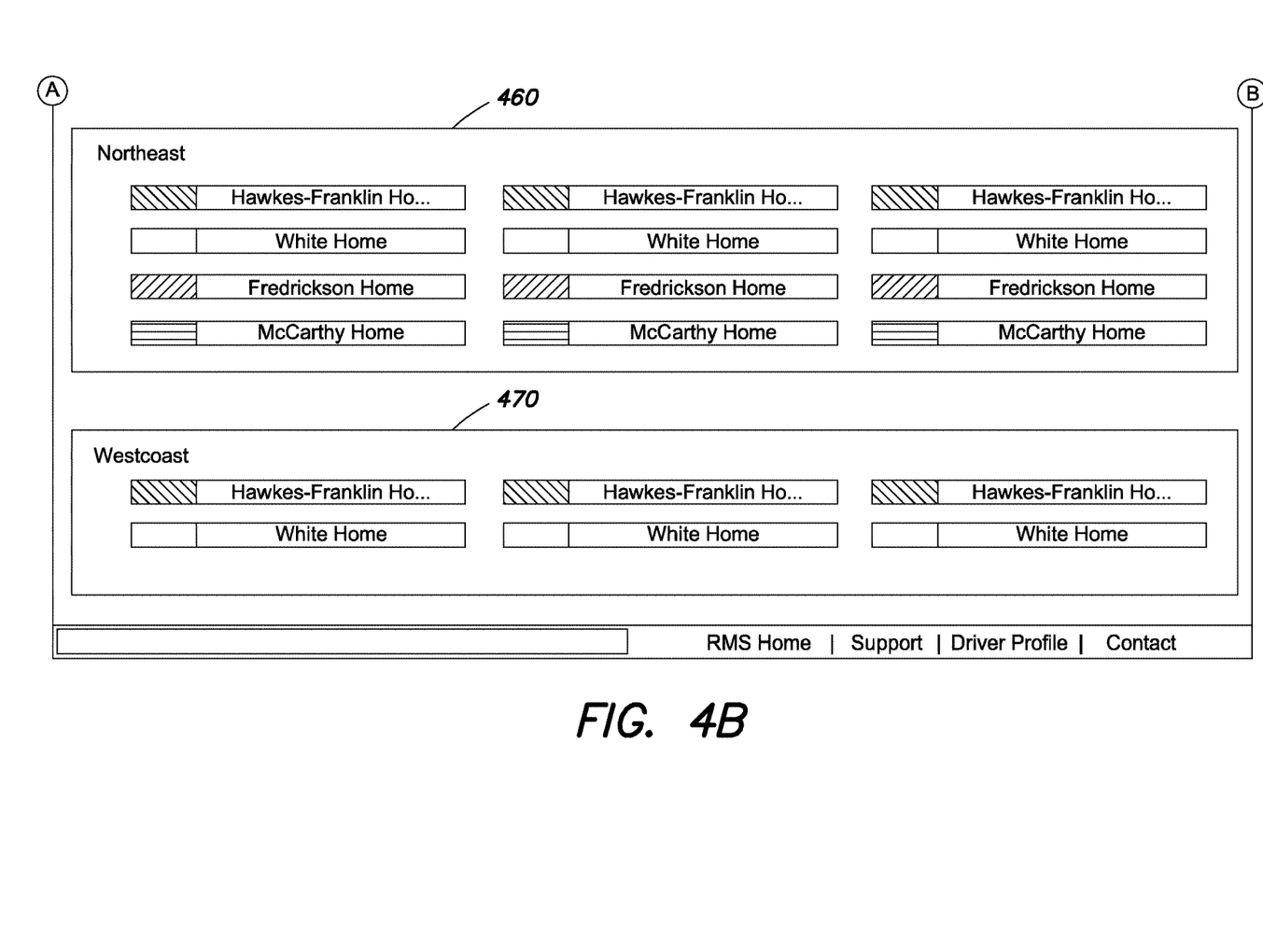

FIGS. 4A and 4B are an example RMS UI screen that provides an all systems view 400. The all systems view 400 lists each the home automation systems 100 bound to the RMS that a user (e.g., a dealer or end user, as the case may be) has authorization to access. An element, such as element 410, may be displayed for each home automation system, that includes a status identifier 420 that indicates (e.g., via color coding) a condition of the home automation system (e.g., "Good", "Warning", "Failure", etc.). In response to user input (e.g., a mouse hover over on an element 410), high-level system information 430 for a selected home automation system (e.g., status, UID, IP address of the host controller, configured name, software version etc.) may be displayed. Further, in response to user input (e.g., a click on an element 410), a system details view for a selected home automation system may be displayed. In the case of a user (e.g., a dealer) who has authorization to access a large number of home automation systems, the user may use grouping controls (not shown) to organize the elements 410 into a number of system groups 440-470. While in the depicted implementation there is one level of grouping, in alternative implementations, inheritance and/or nesting may be utilized to provide multiple levels.

Figure 5A:
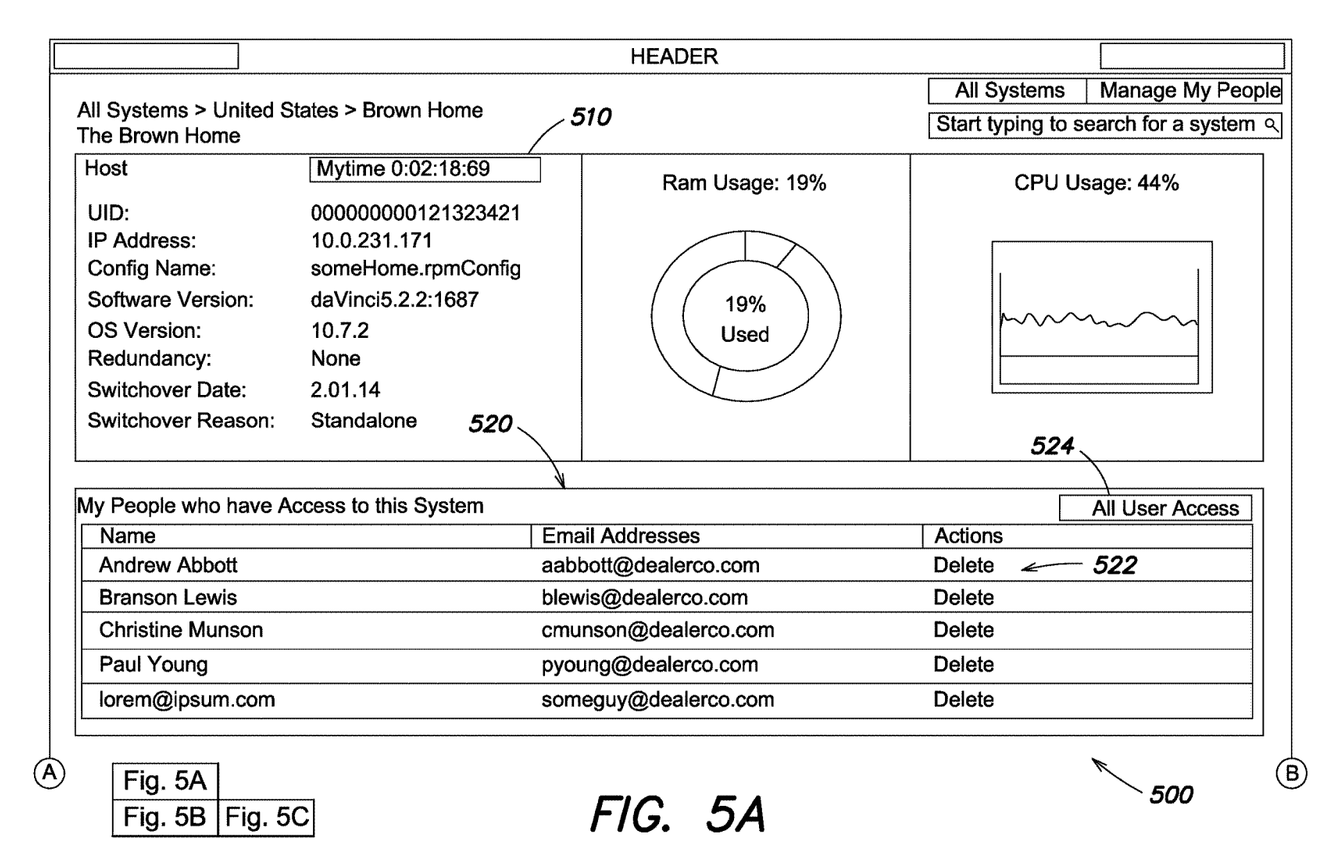
FIGS. 5A, 5B and 5C are an example RMS UI screen that provides a system details view of a selected home automation system, that may be displayed in response to user input in connection with the all systems view.
Figure 5B:
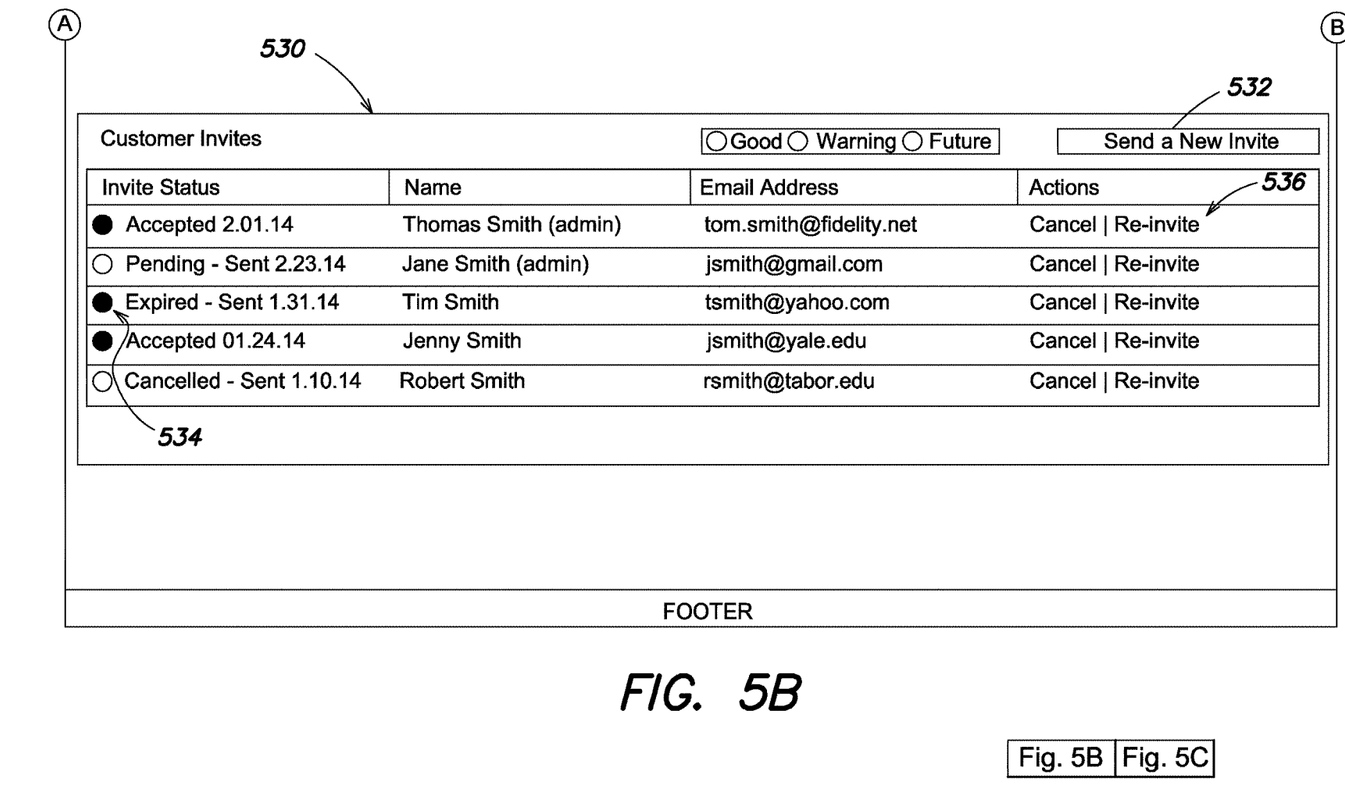
Figure 5C:
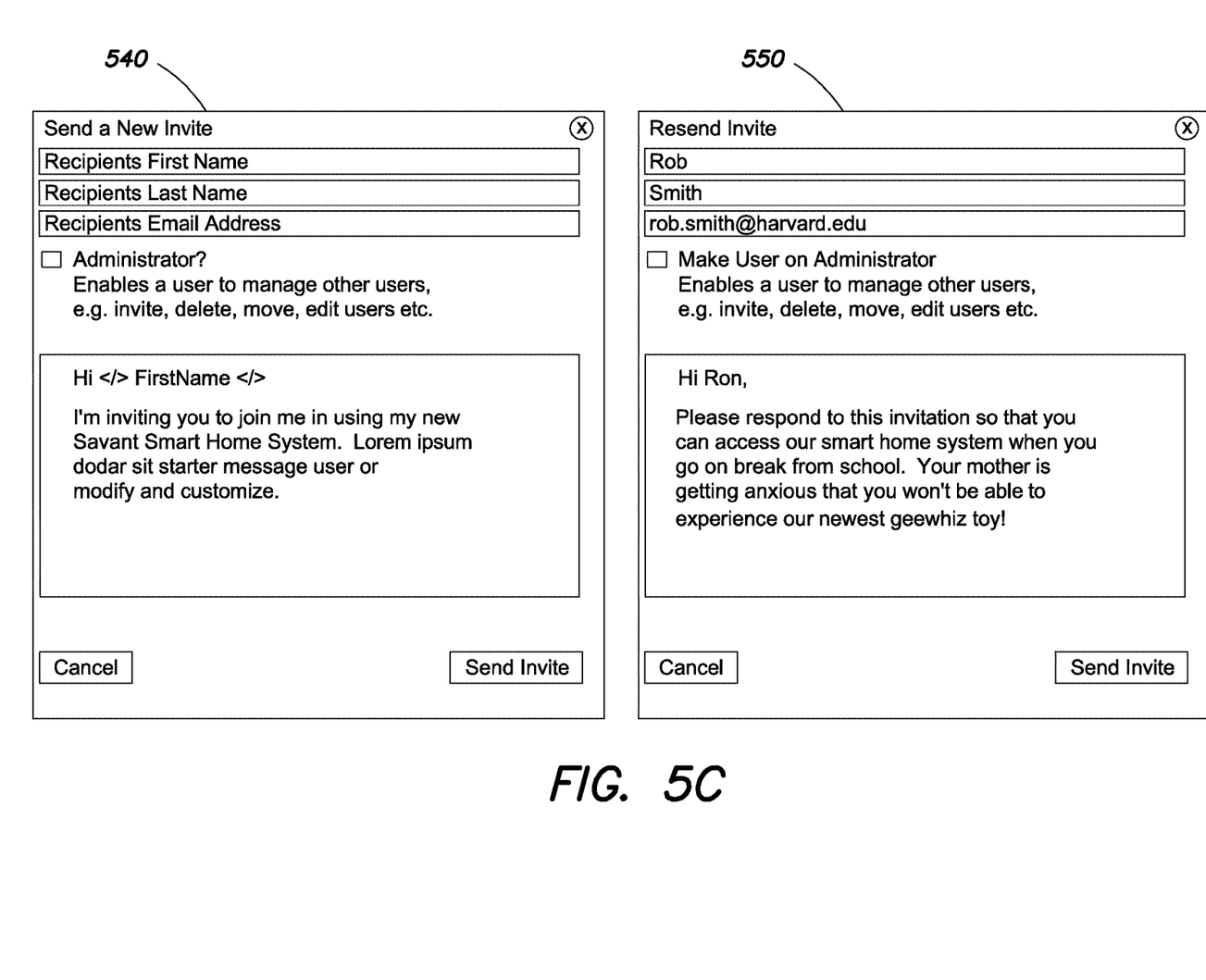

FIGS. 5A, 5B and 5C are an example RMS UI screen that provides a system details view 500 of a selected home automation system 100, that may be displayed in response to user input in connection with the all systems view 400. The system details view 500 includes a high-level system information panel 510, that include information such as UID, IP address of the host controller, configured name, software version, resource usage, etc. An access panel 520 may list individuals (e.g., end users, employees of the dealer, etc.) that have access to the selected home automation system 100. Using delete controls 522 and add user access controls 524, a user (e.g., a dealer or end user as the case may be) with appropriate permissions may modify such individual's remote access to the system 100. The system details view may also include an invitations panels 530 that is part of an invitation system of the RMS 300. Using the invitation panel 530 a user (e.g., a dealer or end user as the case may be) may see individuals that have been invited to access a home automation system, modify such access, and invite additional individuals to have access to the home automation system. An invite may take the form of a personalized email message sent to an individuals that includes embedded code (e.g., a hyperlink), using which the individual may confirm their ability to remotely access the selected home automation system.

Using new invite controls 532 a user may trigger a modal invite form window 540, that may be shown superimposed upon system details view 500 or separately therefrom. In the modal invite window 532, a user may identify an individual to be invited (e.g., via name and email address), select an access level to be accorded (e.g., provide or withhold an administrator access level that includes invitations permissions), and customize a text message to be provided along with the embedded code. After an invite is sent, a status of the invite (e.g., accepted, pending expired, canceled, etc.) may be displayed in a status field 534 in the invitation panel 530.

Further, cancellation and re-invite controls 536 may be provided in the invitation panel 530 to cancel an invitation sent to an individual, or re-invite the individual with an updated invite. Using the re-invite control, a user may trigger a modal re-invite form window 550, that may be shown superimposed upon the system details view 500 or shown separately. In the modal re-invite form window 550 a user may update the access level to be accorded, and customize a text message to be provided along with the embedded code.

Figure 6A:
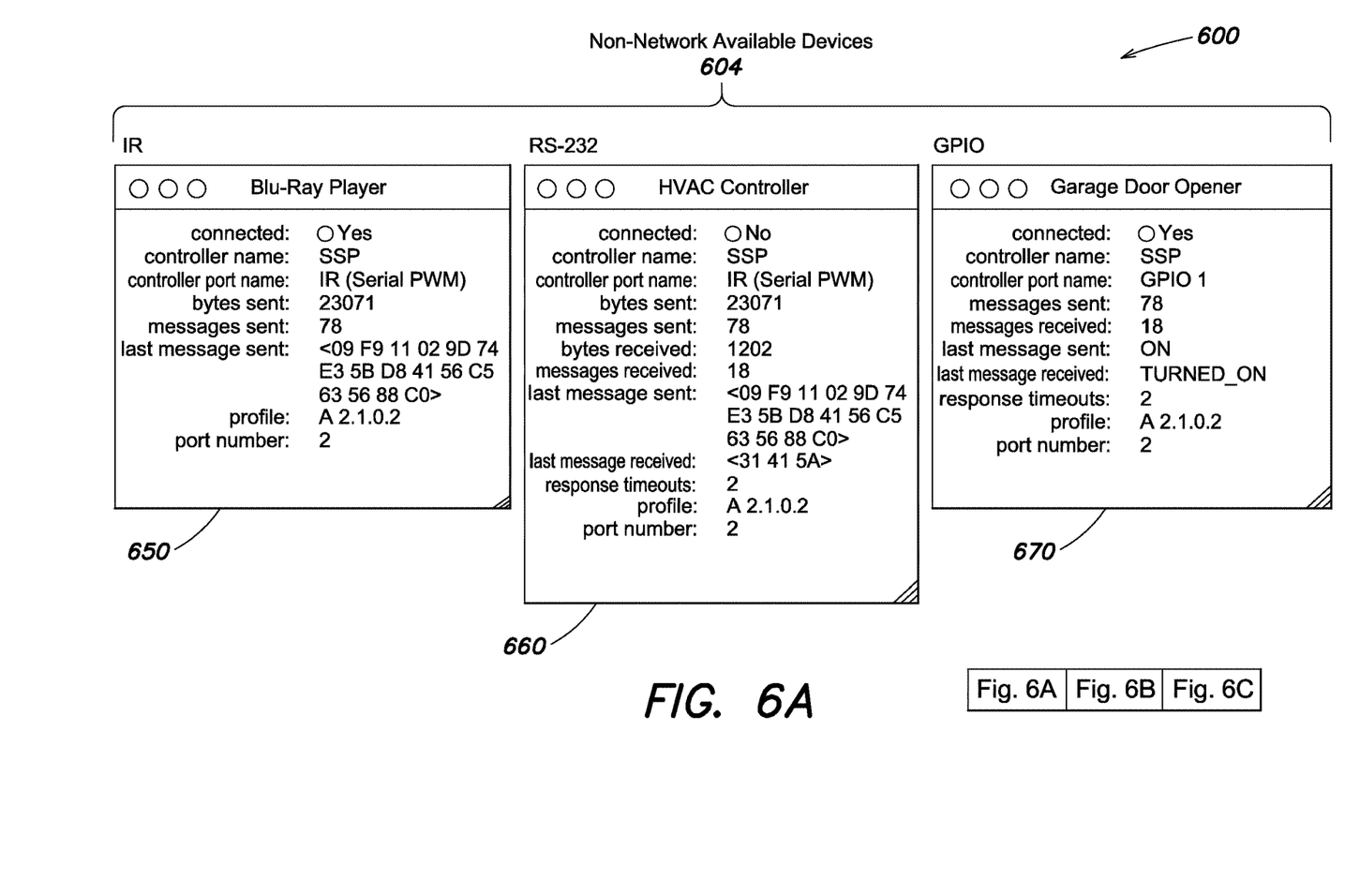
FIGS. 6A, 6B and 6C are an example RMS UI screen that provides an equipment level view of a selected home automation system, that may be displayed in response to user input in connection with the all systems view or system details view.
Figure 6B:
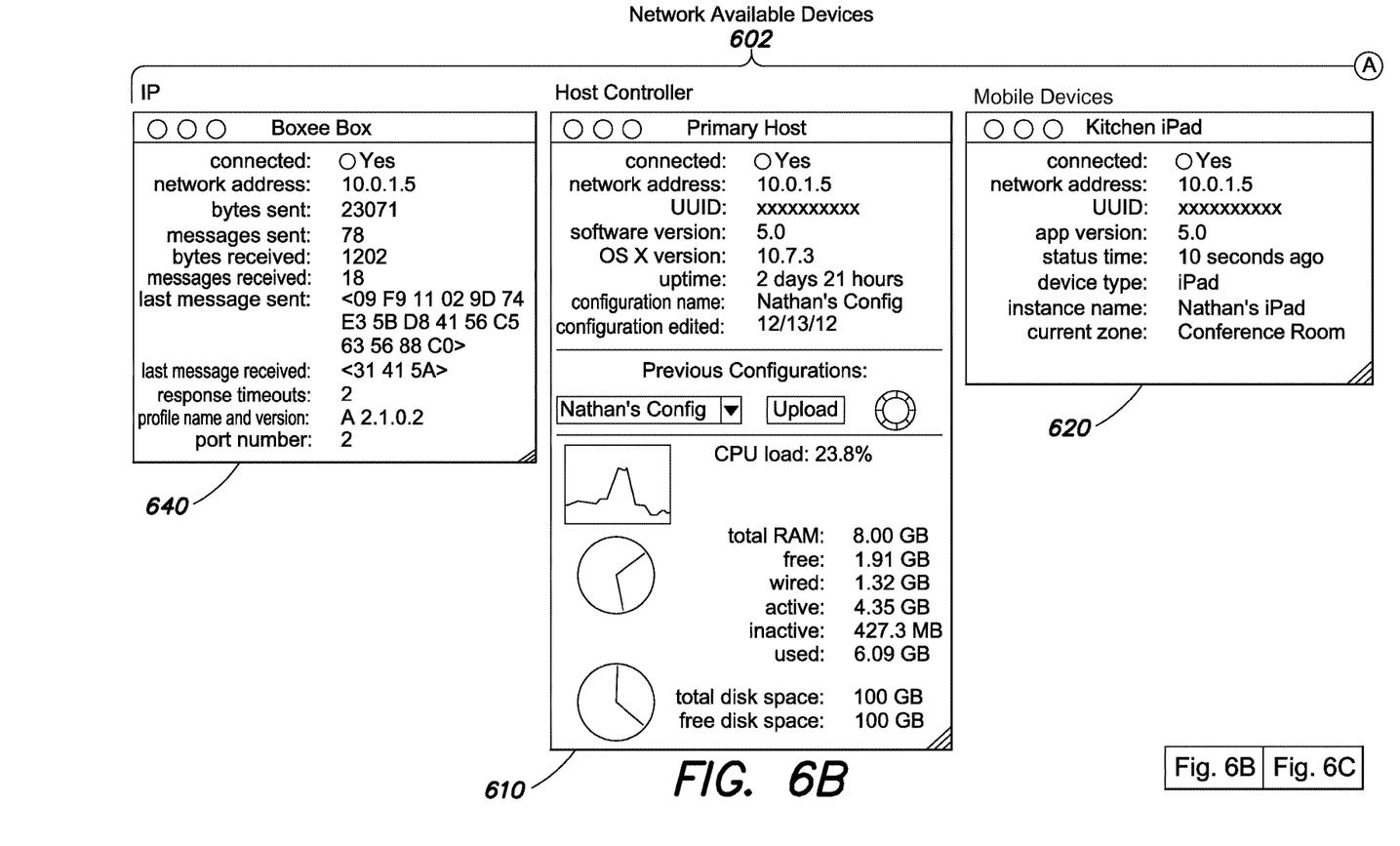
Figure 6C:
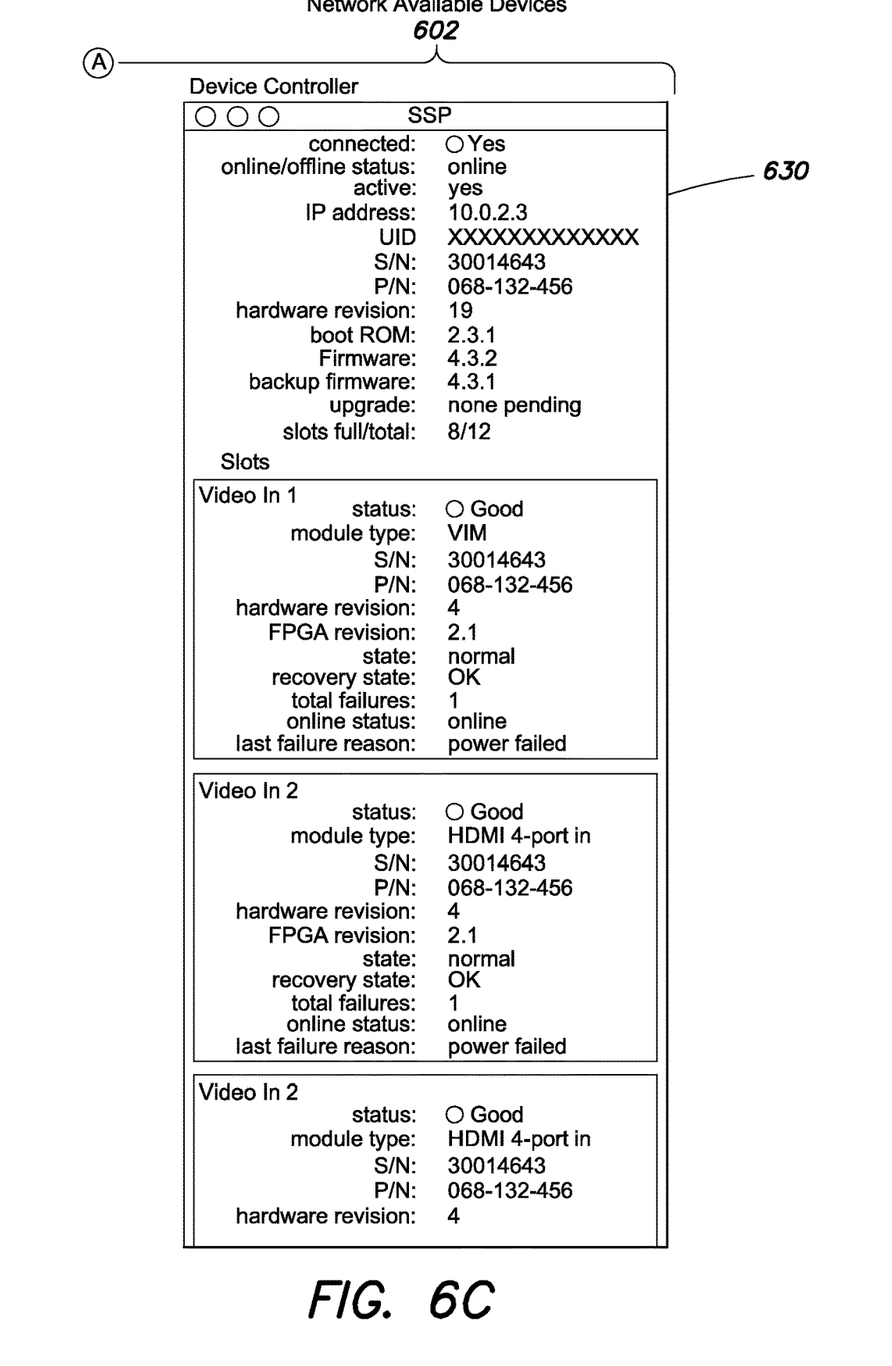

FIGS. 6A, 6B and 6C are an example RMS UI screen that provides an equipment level view 600 of a selected home automation system 100, that may be displayed in response to user input in connection with the all systems view 400 or system details view 500. The equipment level view 600 may show status and diagnostics information for individual devices of the selected home automation system, including network available devices 602 and non-network available devices 604. For example, a panel 610 may be displayed for a host controller, a panel 620 may be displayed for one or more mobile devices, a panel 630 may be displayed for one or more device controllers, as well as additional panels 640 for one or more controlled devices and/or subsystems that are accessible on an IP-based network within the home, for example LAN 160. Such panels may display information including, where applicable, connection status, UID, IP address, configured name, software version, device type, resource usage, as well as other types of status and diagnostics information. Similarly panels may be displayed for non-network available devices 604. For example, a panel 650 may be displayed for one or more devices and/or subsystems that communicate with the host controller 110 and/or device controllers 120 via IR, a panel 660 may be displayed for one or more devices and/or subsystems that communicate with the host controller 110 and/or device controllers 120 via RS-232, and a panel 670 may be displayed for one or more devices and/or subsystems that communicate via GPIO. Such panels may display information such as, where applicable, host controller name, port name, messaging characteristics, as other types of status and diagnostics information.

Figure 7:
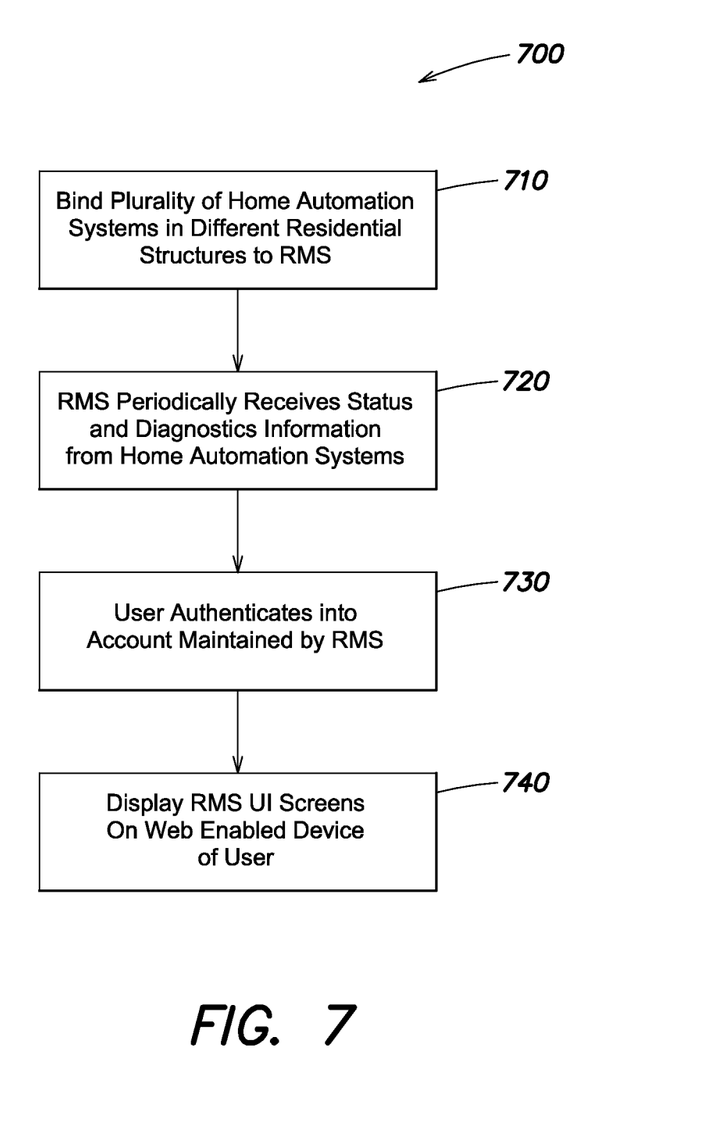
FIG. 7 is a flow diagram of an example sequence of steps for managing a plurality of home automation systems in different residential structures.

FIG. 7 is a flow diagram of an example sequence of steps 700 for managing a plurality of home automation systems in different residential structures. At step 710, the plurality of home automation systems in different residential structures are bound to the cloud-based RMS 300. The binding includes opening a connection between at least a host controller and/or device controller of each of the home automation systems and the RMS, and maintaining each connection open. At step 720, the RMS 300 periodically receives status and diagnostics information from the plurality of home automation systems, via the open connections. At step 730, a user (e.g., a dealer or an end-user, as the case may be) may authenticate into an account maintained by the RMS 300 having permissions to remotely access home automation systems associated with the user. At step 740, RMS UI screens 240 may be displayed on a web-enabled device of the user 230, 250 (e.g., dealer or end user, as the case may be). The RMS UI screens 240 may include an all systems view 400 which lists each the plurality of home automation systems, a system details view 500 which shows a summary of status information for a selected one of the plurality of home automation systems, and an equipment level view 600 which shows status information for individual devices of the selected home automation system. At least some of the individual devices may be non-network available devices that lack a direct connection to an IP-based network. The RMS UI screens 240 may provide access to an invitation system using which the user may invite an individual to remotely access a given home automation system, for which they have invitation permissions.

It should be understood that various adaptations and modifications may be made within the spirit and scope of the embodiments discussed herein. While some of the embodiments involve a home automation systems that are capable of A/V control, lighting control, HVAC control, and other types of control, it should be understood that the techniques may be applicable more limited systems that, for example, may be limited to controlling only a single type of device (e.g., only A/V devices, only lighting devices, etc.). Further, it should be understood that in different embodiments software may be executed on different hardware devices than as shown above.

In general, many of the techniques may be alternatively implemented in in various combinations thereof. Software implementations may include machine-executable instructions (e.g., computer-executable instructions) stored in a non-transitory electronic device-readable medium (e.g., a non-transitory computer-readable medium), such as a volatile or persistent memory, a hard-disk, a compact disk (CD), or other tangible medium. Hardware implementations may include configured, logic circuits, application specific integrated circuits, and/or other types of hardware components. Further, combined software/hardware implementations may include both computer-executable instructions stored in a non-transitory computer-readable medium, as well as one or more hardware components, for example, processors, memories, etc. In general, it should be understood that the above descriptions are meant to be taken only by way of example.

What is claimed is:

1. A method for managing a plurality of home automation systems in different residential structures:

binding, during an installation or reconfiguration of each of the plurality of home automation systems in different residential structures by dealers, the respective home automation system to a cloud-based residential management system (RMS), wherein each home automation system includes at least one host controller that provides control functions and compiles and maintains status and diagnostic information, a plurality of controlled devices, and at least one mobile device for displaying user interfaces (UIs) in which input for interacting with the home automation system is received;

authorizing a dealer to access a subset of the plurality of home automation systems the dealer installed or reconfigured, while preventing access to any of the plurality of home automation systems serviced by one or more other dealers;

periodically receiving status and diagnostics information for each of the plurality of home automation systems in the respective residential structures at the RMS, the status and diagnostic information received directly from one or more devices of the home automation systems that have a direct connection to an Internet Protocol (IP)-based network and are capable of establishing a websocket connection to the RMS, directly from one or more mobile devices of the home automation systems that have a direct connection to an IP-based network and are capable of establishing a websocket connection to the RMS, and from a state center of a host controller of the home automation systems for one or more non-network available devices of home automation systems that lack a direct connection to an IP-based network and are incapable of establishing a websocket connection to the RMS; and displaying, on a web-enabled device of the dealer, a plurality of RMS UI screens that provide the dealer at least status information for individual controlled devices and an individual mobile device of a selected home automation system of the subset of home automation systems.

2. The method of claim 1, wherein the binding further comprises: opening and maintaining open the websocket connection between at least a host controller of each of the home automation systems and the RMS.

3. The method of claim 2, wherein the one or more controlled devices of home automation systems capable of establishing a websocket connection to the RMS include a device controller, and the binding further comprises:
opening and maintaining open an additional websocket connection between the device controller of at least one of the home automation systems and the RMS.

4. The method of claim 1, wherein the binding further comprises:
providing a unique identifier (UID) of a host controller of each home automation system to the RMS.

5. The method of claim 1, wherein the plurality of RMS UI screens provide an invitation system usable to invite an individual to remotely access the selected home automation system.

6. The method of claim 5, wherein the invitation system operates to send a personalized email message to the individual that includes embedded code.

7. A non-transitory electronic-device readable medium storing executable instructions that when executed on one or more processors are operable to:
bind to a plurality of home automation systems in different residential structures during a dealer installation or reconfiguration of the home automation systems, wherein each home automation system includes at least one host controller that provides control functions and compiles and maintains status and diagnostic information, a plurality of controlled devices, and at least one mobile device for displaying user interfaces (UIs) in which input for interacting with the home automation system is received;

authorize a dealer to access a subset of the plurality of home automation systems that the dealer that installed or reconfigured, while preventing access to any of the plurality of home automation systems serviced by one or more other dealers;

receive status and diagnostics information for each of the plurality of home automation systems in the respective residential structures, the status and diagnostic information received directly from one or more of the controlled devices of home automation systems that have a direct connection to an Internet Protocol (IP)-based network and are capable of establishing a websocket connection, directly from one of more mobile devices of the home automation systems that have a direct connection to an IP-based network and are capable of establishing a websocket connection, and from a state center of a host controller of the home automation systems for one or more non-network available devices of home automation systems that lack a direct connection to an IP-based network and are incapable of establishing a websocket connection; and provide a plurality of web-based UI screens that include at least status information for individual controlled devices and an individual mobile device of a selected home automation system of the subset of home automation systems.

8. The non-transitory electronic-device readable medium of claim 7, wherein the executable instructions when executed are further operable to:
open and maintain open the websocket connection to at least a host controller of each of the home automation systems.

9. The non-transitory electronic-device readable medium of claim 8, wherein the one or more controlled devices of home automation systems capable of establishing a websocket connection include a device controller, and the executable instructions when executed are further operable to:
open and maintain open an additional websocket connection to the device controller of at least one of the home automation systems.

10. The non-transitory electronic-device readable medium of claim 7, wherein the plurality of home automation systems are bound based on a unique identifier (UID) of a host controller of each home automation system.

11. The non-transitory electronic-device readable medium of claim 7, wherein the plurality of RMS UI screens provide an invitation system usable to invite an individual to remotely access a home automation system.

12. The non-transitory electronic-device readable medium of claim 11, wherein the invitation system operates to send a personalized email message to the individual that includes embedded code.

13. A method for managing a plurality of home automation systems in different residential structures, comprising:
binding, during an installation or reconfiguration of each of the plurality of home automation systems in different residential structures by dealers, the respective home automation system to a residential management system (RMS), wherein each home automation system includes at least one host controller that provides control functions and compiles and maintains status and diagnostic information, a plurality of controlled devices, and at least one mobile device for displaying user interfaces (UIs) in which input for interacting with the home automation system is received;

authorizing a dealer to access a subset of the plurality of home automation systems the dealer installed or reconfigured, while preventing access to any of the plurality of home automation systems serviced by one or more other dealers;

obtaining status information from the plurality of home automation systems at the RMS, the status information received directly from one or more controlled devices of the home automation systems that have a direct connection to an Internet Protocol (IP)-based network and are capable of establishing a connection to the RMS, directly from one or more mobile devices of the home automation systems that have a direct connection to an IP-based network and are capable of establishing a connection to the RMS, and from a state center of a host controller of the home automation systems for one or more non-network available devices of home automation systems that lack a direct connection to an IP-based network and are incapable of establishing a connection to the RMS; and displaying, on a web-enabled device of the dealer, a plurality of RMS UI screens that provide the dealer at least status information for individual controlled devices and an individual mobile device of a selected home automation system of the subset of home automation systems.

14. The method of claim 13, wherein the plurality of RMS UI screens also provide an invitation system usable to invite an individual to remotely access the selected home automation system.

* * * * *

UNITED STATES PATENT AND TRADEMARK OFFICE
CERTIFICATE OF CORRECTION

Page 1 of 1

PATENT NO.         : 10,447,492 B1
APPLICATION NO.    : 14/339864
DATED              : October 15, 2019
INVENTOR(S)        : Arthur A. Jacobson et al.

It is certified that error appears in the above-identified patent and that said Letters Patent is hereby corrected as shown below:

In the Claims

Column 10, Line 13 reads:
"socket connection, directly from one of more mobile"
Should read:
--socket connection, directly from one or more mobile--

Signed and Sealed this
Seventeenth Day of March, 2020

Andrei Iancu
*Director of the United States Patent and Trademark Office*